Patented June 7, 1938

2,119,599

UNITED STATES PATENT OFFICE 2,119,599

MILK PRODUCT AND PROCESS OF MANUFACTURING THE SAME

Frederic W. Nordsiek, New York, N. Y., assignor, by mesne assignments, to The Sanoderm Company, Inc., New York, N. Y., a corporation of New York No Drawing. Application August 5, 1937,
Serial No. 157,522

14 Claims. (Cl. 99—59)

The present invention relates to milk products and processes of manufacturing the same and embodies, more specifically, a milk product which consists of a mild aromatic yoghurt curdled milk having a negligible degree of acidity and being devoid of the disagreeable taste, odor and characteristics of ordinary yoghurt. The product, on the other hand, contains the fermentation products of a mixture of yoghurt bacteria and, being highly palatable, is of great dietetic value.

This is a continuation in part of my application Serial No. 738,427, filed August 4, 1934.

In the prior patent of Gustav Winkler No. 1,710,133, granted April 23, 1929, there is described a milk product and process of manufacturing the same in which a mixed culture is utilized. A detailed description of the process described in this prior patent will not be made herein, the present invention residing in certain improvements in the cultures used and the cultivation thereof and in the product and particular process of preparation.

An object of the invention is to provide an improved milk product having a normal quantity of yoghurt bacteria, but being devoid of the disagreeable taste and odor thereof, the product having a desirable consistency and an agreeable taste and odor.

A further object of the invention is to provide a process by means of which a yoghurt milk product is obtained, the process resulting in a product which is substantially free of acidity and of the disagreeable characteristics of yoghurt bacteria, at the same time preserving all of the beneficial dietetic properties of yoghurt bacteria.

A further object of the invention is to provide an improved culture and process of preparing the same by means of which milk may be advantageously treated.

Further objects of the invention will be apparent as it is described in further detail, the pure cultures and the method of cultivating the same first being described and then the particular method of preparing the improved milk product.

At the outset the invention proposes to treat milk with mixed cultures prepared from pure cultures of Lactobacillus acidophilus and Streptococcus thermophilus. Cultures of Lactobacillus acidophilus are obtainable from the New York State Agricultural Experiment Station at Geneva, New York, Dr. C. S. Peterson's numbering of satisfactory cultures being as follows:

No. 33 Farr (#FF) acidophilus milk.
No. 35 Myers acidophilus milk 1929.
No. B1 U. S. D. A. milk.

Cultures of this organism may be carried in tubes containing 10 cc. of skim milk sterilized in the autoclave at 15 pounds for 20 minutes. At each transfer, 1 cc. of the culture is transferred to a tube of sterile milk by means of a sterile glass pipette.

When first received these cultures are grown at 37 degrees centigrade. They are then habituated to 40 degrees centigrade by slowly raising the incubation temperature over a period of several weeks. During this preliminary work the cultures are incubated until firmly coagulated and then held in an icebox or other suitable cooling chamber until the next transfer.

After being habituated to 40° centigrade cultures of Lactobacillus acidophilus must meet the following requirements:

1. With 5% inoculation they must coagulate sterile milk in seven hours at 40° C.
2. There must be no unpleasant taste, odor or consistency.
3. They must be adapted to growth in equilibrium with Streptococcus thermophilus, as explained hereinafter.

Pure cultures of Streptococcus thermophilus are obtainable commercially, being identified as "Streptococcus Thermophilus 4915". This organism is cultivated and acclimatized to 40° centigrade in the manner outlined above for the culture of Lactobacillus acidophilus. The culture must produce no unpleasant flavor or odor and must grow satisfactorily in equilibrium with Lactobacillus acidophilus, as explained hereinafter.

The preparation of a mixed culture is effected by mixing one cubic centimeter each of suitable cultures of Lactobacillus acidophilus and Streptococcus thermophilus, these quantities being added to tubes containing 10 cc. of autoclave sterilized skim milk, shaken thoroughly and incubated at 40° C. for seven hours.

After initial mixing, these cultures are carried by transferring 1 cc. to a sterile milk tube, incubating at 40° C. for five hours and thereupon storing in a refrigerator at a sufficiently low temperature to prevent further growth.

The equilibrium of the mixed cultures is observed and controlled by means of stained smears examined under the microscope. A culture which is satisfactorily balanced shows approximately equal numbers of cocci and rods. If either organism shows marked and continued diminution of numbers, it may be remedied by adding, at the next transfer, 1 cc. of a pure culture of the lacking organism.

The mother culture used in carrying out the process of the present invention is obtained by autoclaving whole milk in Erlenmeyer flasks, the size of which depend upon how much of the finished product is to be made. These are inoculated with 10% of a mixed culture from a tube culture, incubated at 40° centigrade for five hours, and immediately transferred to the icebox. Before use, mother cultures are examined microscopically to insure a proper equilibrium between the cocci and rods.

Preparation of the milk product is accomplished by heating whole or skimmed milk to a sterilizing temperature of approximately 100° C. in a double boiler or steam-jacketed kettle for one-half to one hour, after the addition of 1% whole milk powder. This milk powder is added before heating and, during heating, .5% gelatin is added.

After preparation as above, the milk is cooled to 40° centigrade and 7% by volume of the mother culture is intimately mixed with it. The product is then passed through a fine sieve and filled aseptically into sterile jars, which are incubated at 40° centigrade for four hours and then transferred to the icebox. After twenty-four hours the product is ready for consumption.

Unless otherwise stated, all percentages are by weight. The product from the foregoing process is practically acid-free and devoid of the characteristic disagreeable odor and taste of yoghurt. By maintaining the foregoing mixed culture in a balanced state, neither organism can produce the disagreeable characteristics in the final product and the pleasant odor and taste noted above results.

I claim:

1. The process of preparing a readily digestible milk product having the valuable dietetic properties of ordinary yoghurt milk, comprising heating milk to substantially 100° C. to reduce foreign bacteria present, cooling to 40° C.; adding a mixed culture of Lactobacillus acidophilus and Streptococcus thermophilus produced by separately acclimating the bacillus and the coccus to an optimum growth temperature of 40° C., mixing and growing the bacillus and the coccus at 40° C., passing through a fine sieve; incubating at 40° C., and cooling.

2. The process set forth in claim 1 in which the heated milk is whole milk.

3. The process set forth in claim 1 in which the heated milk is skimmed milk.

4. The process of preparing a readily digestible milk product having the valuable dietetic properties of ordinary yoghurt milk, comprising heating milk to substantially 100° C. to reduce foreign bacteria present, cooling to 40° C., adding seven per cent by volume of a mixed culture of Lactobacillus acidophilus and Streptococcus thermophilus, produced by separately acclimating the bacillus and the coccus to an optimum growth temperature of 40° C., mixing and growing the bacillus and the coccus at 40° C., passing through a fine sieve; incubating at 40° C., and cooling.

5. The process of preparing a readily digestible milk product having the valuable dietetic properties of ordinary yoghurt milk, comprising adding 1% of whole milk powder to milk, heating the milk to substantially 100° C. to reduce foreign bacteria present, cooling to 40° C.; adding a mixed culture of Lactobacillus acidophilus and Streptococcus thermophilus produced by separately acclimating the bacillus and the coccus to an optimum growth temperature of 40° C., mixing and growing the bacillus and the coccus at 40° C., passing through a fine sieve; incubating at 40° C., and cooling.

6. The process of preparing a readily digestible milk product having the valuable dietetic properties of ordinary yoghurt milk, comprising heating milk to substantially 100° C. to reduce foreign bacteria present, adding .5% of gelatin while hot, cooling to 40° C.; adding a mixed culture of Lactobacillus acidophilus and Streptococcus thermophilus produced by separately acclimating the bacillus and the coccus to an optimum growth temperature of 40° C., mixing and growing the bacillus and the coccus at 40° C., passing through a fine sieve; incubating at 40° C., and cooling.

7. The process of preparing a readily digestible milk product having the valuable dietetic properties of ordinary yoghurt milk, comprising heating milk to substantially 100° C. to reduce foreign bacteria present, adding .5% gelatin while hot, cooling to 40° C.; adding 7% by volume of a mixed culture of Lactobacillus acidophilus and Streptococcus thermophilus produced by separately acclimating the bacillus and the coccus to an optimum growth temperature of 40° C., mixing and growing the bacillus and the coccus at 40° C., passing through a fine sieve, incubating at 40° C. for four hours, and cooling.

8. The process of preparing a readily digestible milk product having the valuable dietetic properties of ordinary yoghurt milk, comprising adding 1% by weight of whole milk powder to milk, heating the milk to substantially 100° C. to reduce foreign bacteria present, adding 0.5% by weight of gelatin while hot, cooling to 40° C.; adding 7% by volume of a mixed culture of Lactobacillus acidophilus and Streptococcus thermophilus produced by separately acclimating the bacillus and the coccus to an optimum growth temperature of 40° C., mixing and growing the mixed culture at 40° C., passing through a fine sieve, incubating at 40° C. for four hours, and cooling.

9. A readily digestible milk product having the valuable dietetic properties of ordinary yoghurt milk, comprising substantially sterile milk and the fermentation product of a 7% by volume mixed culture of Lactobacillus acidophilus and Streptococcus thermophilus having a pleasant taste and odor and capable of optimum growth in equilibrium at 40° C.

10. A readily digestible milk product having the valuable dietetic properties of ordinary yoghurt milk, comprising substantially sterile milk having therein .5% by weight of gelatin and the fermentation product of a 7% by volume mixed culture of Lactobacillus acidophilus and Streptococcus thermophilus having a pleasant taste and odor and capable of optimum growth in equilibrium at 40° C.

11. A readily digestible milk product having the valuable dietetic properties of ordinary yoghurt milk, comprising substantially sterile milk containing the fermentation product of a minor percentage of a mixed culture of Lactobacillus acidophilus and Streptococcus thermophilus having a pleasant taste and odor and capable of optimum growth in equilibrium at 40° C.

12. The product set forth in claim 11 in which the sterile milk is whole milk.

13. The product set forth in claim 11 in which the sterile milk is skimmed milk.

14. A readily digestible milk product having the valuable dietetic properties of ordinary yoghurt milk, comprising substantially sterile milk containing 0.5% gelatin and the fermentation product of a minor percentage of a mixed culture of Lactobacillus acidophilus and Streptococcus thermophilus having a pleasant taste and odor and capable of optimum growth in equilibrium at 40° C.

FREDERIC W. NORDSIEK.